United States Patent
Kuehner et al.

(10) Patent No.: US 8,369,049 B2
(45) Date of Patent: Feb. 5, 2013

(54) METHOD FOR SHUTTING DOWN AN ELECTRIC MACHINE IN THE EVENT OF A MALFUNCTION

(75) Inventors: Jochen Kuehner, Backnang (DE); Martin Trunk, Moeglingen (DE); Klaus Rechberger, Ludwigsburg (DE); Manfred Ackermann, Oppenweiler (DE); Manfred Stahl, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 600 days.

(21) Appl. No.: 12/160,523

(22) PCT Filed: Jan. 19, 2007

(86) PCT No.: PCT/EP2007/050525
§ 371 (c)(1),
(2), (4) Date: Apr. 16, 2010

(87) PCT Pub. No.: WO2007/085566
PCT Pub. Date: Aug. 2, 2007

(65) Prior Publication Data
US 2010/0202089 A1 Aug. 12, 2010

(30) Foreign Application Priority Data
Jan. 24, 2006 (DE) .......................... 10 2006 003 254

(51) Int. Cl.
*H02P 3/12* (2006.01)
(52) U.S. Cl. ............ 361/3; 318/800; 318/798; 318/801; 318/803; 361/18; 361/90
(58) Field of Classification Search ............ 361/30, 361/89, 195, 140; 318/364, 445, 798, 806, 318/801, 807, 812; 307/141, 140; 327/261, 327/392
See application file for complete search history.

(56) References Cited

U.S. PATENT DOCUMENTS

| | | | |
|---|---|---|---|
| 4,016,459 A * | 4/1977 | Boehringer | 361/88 |
| 5,757,596 A * | 5/1998 | Weber et al. | 361/23 |
| 5,877,601 A | 3/1999 | Obara et al. | |
| 6,369,543 B1 | 4/2002 | Masselus et al. | |

(Continued)

FOREIGN PATENT DOCUMENTS

| | | |
|---|---|---|
| DE | 10205963 | 9/2003 |
| EP | 0933858 | 8/1999 |
| EP | 1536552 | 6/2005 |
| JP | 9-163791 | 6/1997 |
| JP | 11-299274 | 10/1999 |

(Continued)

OTHER PUBLICATIONS

International Search Report, PCT International Patent Application No. PCT/EP2007/050525, dated Apr. 25, 2007.

*Primary Examiner* — Rita Leykin
(74) *Attorney, Agent, or Firm* — Kenyon & Kenyon LLP

(57) ABSTRACT

A method for shutting down an electric machine having a pulse-controlled inverter in the event of a malfunction. Undesirable side effects during shut-down of the electric machine may be minimized and the regular machine operation may be maximized when the electric machine is first switched to a disconnect mode in which all switches of the pulse-controlled inverter are open and subsequently is switched to a short-circuit mode in which the switches connected to the high potential are open and the switches connected to the low potential are closed.

8 Claims, 2 Drawing Sheets

U.S. PATENT DOCUMENTS

| | | | |
|---|---|---|---|
| 6,781,341 B2 * | 8/2004 | Nakamichi et al. | 318/685 |
| 7,099,127 B2 * | 8/2006 | Chuang et al. | 361/18 |
| 7,129,652 B2 * | 10/2006 | Patel et al. | 315/291 |
| 7,355,826 B2 * | 4/2008 | Ochiai et al. | 361/23 |
| 7,372,686 B2 * | 5/2008 | Ochiai | 361/93.1 |
| 7,479,770 B2 * | 1/2009 | Kohout et al. | 323/271 |

FOREIGN PATENT DOCUMENTS

| | | |
|---|---|---|
| WO | WO 03/084045 | 10/2003 |
| WO | WO 03084045 A1 * | 10/2003 |

* cited by examiner

METHOD FOR SHUTTING DOWN AN ELECTRIC MACHINE IN THE EVENT OF A MALFUNCTION

FIELD OF THE INVENTION

The present invention relates to a method and device for shutting down an electric machine having a pulse-controlled inverter in the event of a malfunction.

BACKGROUND INFORMATION

Electric machines having pulse-controlled inverters are used in hybrid motor vehicles, for example, where they are operated optionally in motor operation or generator operation. In motor operation, the electric machine generates an additional driving torque, which supports the internal combustion engine, e.g., in an acceleration phase; in generator operation, it generates electric power, which is stored in an energy accumulator, e.g., a battery or a supercap. The operating mode and power of the electric machine are adjusted via the pulse-controlled inverter.

Conventional pulse-controlled inverters (PCI) include a number of switches with which the individual phases (U, V, W) of the electric machine are optionally switched to a high potential, the so-called d.c. link voltage, or to a low reference potential, in particular ground. The switches are triggered by an external control unit, which calculates a setpoint operating point for the electric machine as a function of the driver input (accelerate or brake). The pulse-controlled inverter is connected to the control unit and receives the corresponding operating data and/or control commands from it.

In the case of a malfunction which may occur, e.g., due to an excessively high battery current or an excessively high feeder current, the pulse-controlled inverter is switched to a safe state to prevent possible damage to electric components. Generally, there are two different conventional shutdown methods that are used here alternatively. In a first method, all switches connected to the low potential (low-side switches) are closed and all switches connected to the high potential (high-side switches) are open. This operating mode is also referred to as short-circuit mode. In another shutdown method, all the switches of the pulse-controlled inverter are open. This is also referred to as the disconnect mode.

The conventional shutdown methods are suitable in principle for protecting the energy accumulator and/or electric components connected thereto, but they have some disadvantages. For example, the phase current may increase for a short time (1-1.5 half waves) after switching to the short-circuit mode. The deployment threshold for the short-circuit mode must therefore be set low accordingly. In addition, switching to the short-circuit mode causes a sudden change in the machine torque, which may have an interfering effect on vehicle performance. Furthermore, in the short-circuit mode, a substantial electric power loss occurs in the electric machine and may result in overheating. The disconnect mode, however, has the disadvantage in particular that the d.c. link voltage may increase by 50 V or more after switching to the disconnect mode. The energy accumulator and other electric components may be overloaded and/or damaged.

SUMMARY

An object of the present invention is to provide a method for shutting down an electric machine which has fewer side effects with respect to a subsequent current or voltage rise, has less effect on the machine torque, and produces less heating of the electric machine. This method should be implementable as inexpensively and as easily as possible.

One aspect of the present invention is to sequentially use the two conventional shutdown modes and first to switch the electric machine to the disconnect mode and then to switch it to the short-circuit mode. The negative effects associated with the disconnect mode may be limited if the disconnect mode is short enough and if the machine is switched relatively quickly to short-circuit mode. In addition, the effects associated with the short-circuit mode occur to a much lesser extent. The sequential interlinking of the disconnect mode and the short-circuit mode may have the significant advantage that the disadvantages mentioned above may be significantly reduced or even eliminated completely.

Switching from the disconnect mode to the short-circuit mode preferably takes place after a predefined time threshold. This is preferably to be adapted to the particular application and may be 10 ms, for example. The stipulation of a time threshold may be implemented easily and inexpensively, e.g., via a timer.

The time criterion mentioned above may optionally be linked to one or more additional criteria, in particular electric current states and/or voltage states of the energy accumulator or of the electric machine. As a result, the pulse-controlled inverter remains in the disconnect mode for a longer period of time and is switched from the disconnect mode to the short-circuit mode only upon reaching critical electric current states and/or voltage states on the electric machine or in the electric network connected thereto.

According to a first example embodiment of the present invention, the transition from the disconnect mode to the short-circuit mode takes place when the time criterion is satisfied and also when an electric current value such as the battery current exceeds a predefined threshold value. Switching to the short-circuit mode occurs only when the battery (charging) current reaches critical levels.

According to a second example embodiment of the present invention, switching to the short-circuit mode occurs when the aforementioned time criterion is satisfied and a voltage value, e.g., the d.c. link voltage, exceeds a predefined threshold value. In this way it is possible in particular to prevent damage to voltage-sensitive components. To measure the aforementioned electric currents or voltages, suitable current and/or voltage sensors are provided. These may be integrated into the control unit.

According to a third example embodiment of the present invention, switching to the short-circuit mode occurs when the aforementioned time criterion is satisfied and the rotational speed of the electric engine exceeds a predefined threshold value. As mentioned in the introduction, the disconnect mode is critical in particular at high rotational speeds because in this case, high voltages are generated by the electric machine accordingly and may damage the battery, i.e., energy accumulator. The threshold value of the rotational speed preferably occurs at approximately 50% of the maximum rotational speed of the electric machine. A suitable rotational speed sensor is preferably provided for measuring the aforementioned rotational speed.

BRIEF DESCRIPTION OF THE DRAWINGS

The present invention is explained in greater detail below on the basis of the accompanying figures.

DETAILED DESCRIPTION OF EXAMPLE EMBODIMENTS

Figure 1:
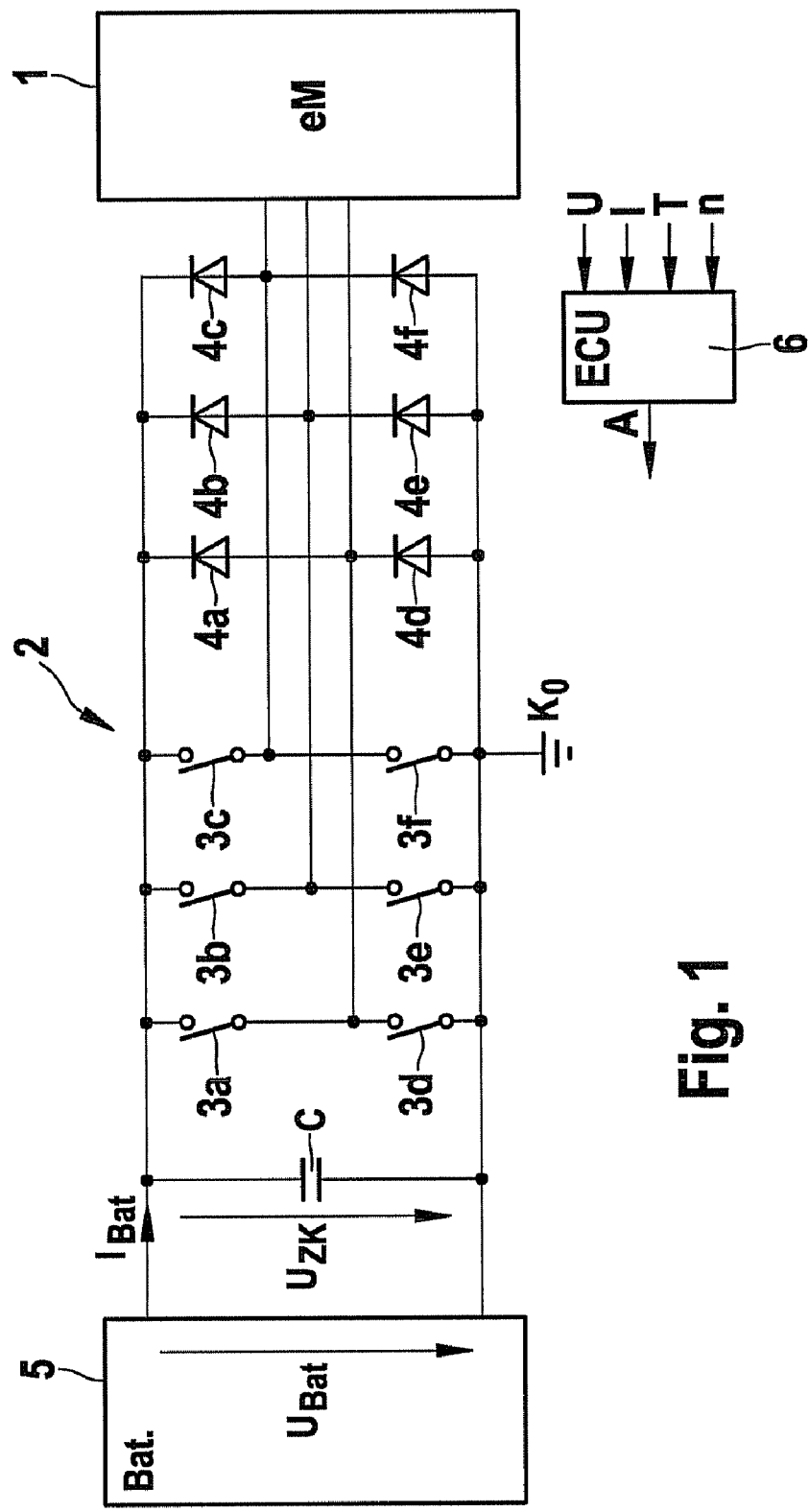
FIG. 1 shows a schematic diagram of a 3-phase electric machine having a pulse-controlled inverter.

FIG. 1 shows a schematic diagram of an electric machine 1 having a pulse-controlled inverter 2 connected thereto. Pulse-controlled inverter (PCI) 2 includes several switches 3a-3f, which are connected to individual phases U, V, W of electric machine 1 and switch phases U, V, W are connected either to a high power supply potential (battery voltage $U_{Bat}$) or a low reference potential (ground). Switches 3a-3c connected to high power supply potential $U_{Bat}$ are referred to as "high-side switches" and switches 3d-3f which are connected to ground are referred to as "low-side switches." Pulse-controlled inverter 2 also includes several freewheeling diodes 4a-4f which are configured in the form of a six-pulse rectifier bridge circuit. One of each diode 4a-4f is connected in parallel to one of switches 3a-3f.

PCI 2 determines the power and operating mode of electric machine 1 and is triggered accordingly by a control unit 6. Electric machine 1 may thus be operated optionally in motor operation or in generator operation. In motor operation, it generates an additional driving torque which supports the internal combustion engine, e.g., in an acceleration phase. In generator operation mechanical energy is converted into electric power and stored in an energy accumulator, a battery 5 here.

A so-called d.c. link capacitor C is situated in parallel with pulse-controlled inverter 2 and generally functions to stabilize battery voltage $U_{Bat}$.

Figure 2:
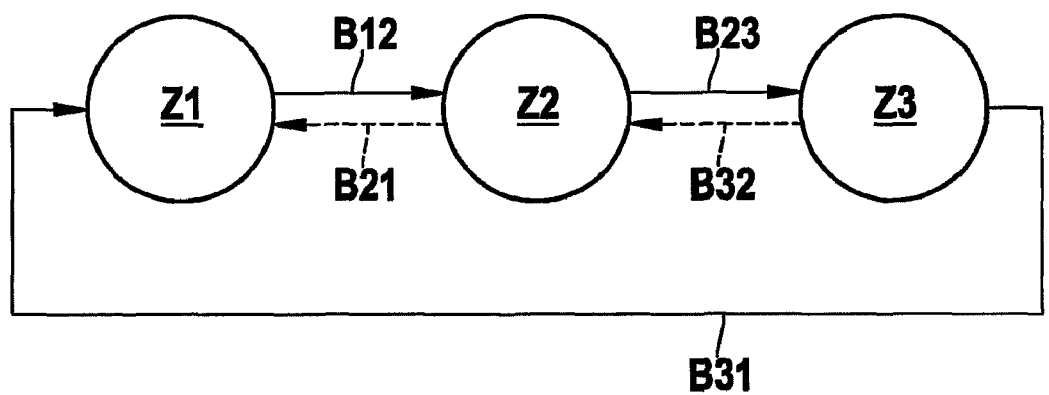
FIG. 2 shows a state diagram of various battery states of an electric machine in the event of a malfunction.

FIG. 2 shows a state diagram of various operating states during shutdown of electric machine 1. State Z1 denotes regular (normal) operation, state Z2 denotes a disconnect mode and state Z3 denotes a short-circuit mode. In the event of a system malfunction due to excessively high current or voltage levels, for example, or an excessively high temperature, pulse-controlled inverter 2, triggered by control unit 6, automatically switches to disconnect mode Z2 to prevent damage to electric machine 1 or to voltage-sensitive components.

The switching condition here is labeled as B12 and may be selected freely, depending on the application. In disconnect mode Z2, all switches 3a-3f are open. Switching condition B12 is usually formulated as a function of a voltage, a current or a temperature. To measure the required electric current, voltage or temperature values, corresponding sensors are provided (e.g., integrated into control unit 6).

When a condition B23 occurs, electric machine 1, i.e., pulse-controlled inverter 2, is automatically switched from disconnect mode (Z2) to short-circuit mode (Z3). For switching to short-circuit mode (Z3), various conditions B23 may be formulated. Switching condition B23 should be selected so that damage to battery 5 in particular is prevented.

A first possibility is to stipulate a strict time condition, for example. In this case, switching to short-circuit mode Z3 occurs when the duration of disconnect mode Z2 has exceeded a predefined time threshold, e.g., 10 ms. This implementation is particularly simple. Switching to short-circuit mode Z3 preferably occurs after a time t, where:

$$t = L \cdot K \cdot I_{max} / [U_{zk} + R \cdot I_{max} \cdot K]$$

in which:
t=decay time linearized to the value zero,
L/R=inductance/resistance (winding of star circuit)
$I_{max}$=maximum feeder current before shutdown
K=factor (value 1.5 . . . 2.0)
$U_{zk}$=d.c. link voltage A second possibility is to switch to short-circuit mode Z3 when the time condition mentioned above has been satisfied and the battery charging current (generator operation) is greater than a predefined threshold value, e.g., 20 A. In this case, the switch to short-circuit mode occurs when the battery charging current has reached critical levels.

A third possibility is to switch pulse-controlled inverter 2 to short-circuit mode Z3 when the time condition defined above has been satisfied and d.c. link voltage $U_{zk}$ exceeds a predefined threshold value. Damage to PCI 2 may be prevented in this case.

A fourth possibility is to switch pulse-controlled inverter 2 to short-circuit mode Z3 when rotational speed n of electric machine 1 exceeds a predefined threshold value. This threshold value is preferably approximately 50% of the maximum rotational speed.

Control unit 6 includes an algorithm which inputs and processes the variables (voltage and/or current and/or temperature and/or rotational speed) required for the implemented method. The control unit preferably includes at least one timer with which the aforementioned time condition is checked. The algorithm operates as described above. When a malfunction is detected, i.e., condition B12 is satisfied, control unit 6 generates a control signal A for PCI 2 with which PCI 2 is initially switched to the disconnect mode. On occurrence of condition B23, control unit 6 generates a control signal A for PCI 2 with which PCI 2 is switched to short-circuit mode Z3.

Figure 3:
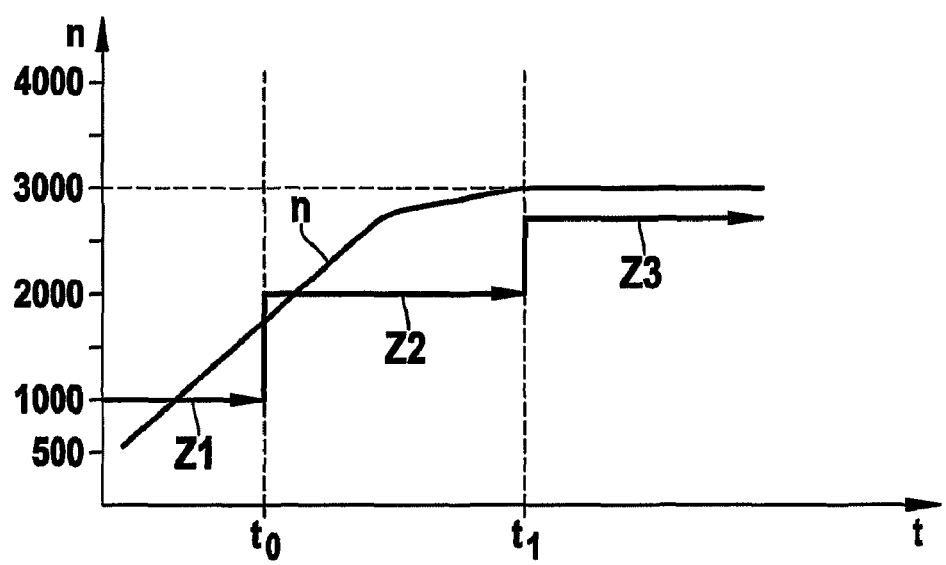
FIG. 3 shows an exemplary diagram of switching to the short-circuit mode depending on rotational speed.

FIG. 3 illustrates switching from disconnect mode Z2 to short-circuit mode Z3 as a function of rotational speed n of electric machine 1 (or a proportional rotational speed). As this shows, electric machine 1 is initially in regular operation with increasing rotational speed n. At point in time t0, a malfunction occurs which satisfies condition B12. Pulse-controlled inverter 2 is then switched to disconnect mode Z2. The 10 ms time threshold is reached shortly after point in time t0. Rotational speed n of electric machine 1 then increases further until reaching 3,000 min$^{-1}$. At point in time t1, condition B23 (t>10 ms and n>3,000 min$^{-1}$) is satisfied. The system switches to short-circuit mode Z3. Return conditions B21 and B31 are of a higher priority here but will not be discussed further.

What is claimed is:

1. A method for operating an electric machine having a pulse-controlled inverter in the event of a malfunction, the method comprising:
    first switching the electric machine to a disconnect mode in which all switches of the pulse-controlled inverter are open, and subsequently switching the electric machine to a short-circuit mode in which switches connected to a high potential are open and switches connected to a low potential are closed, the switching occurring in the event of a malfunction of the electric machine.

2. The method as recited in claim 1, wherein the electric machine is switched from the disconnect mode to the short-circuit mode when a predefined time threshold is exceeded.

3. The method as recited in claim 2, wherein the time threshold is selected according to an equation $$t = L \cdot K \cdot Imax / [Uzk + R \cdot Imax \cdot K]$$

in which L is inductance, K is a factor, Imax is a maximum feeder current before shutdown, Uzk is a d.c. link voltage, and R is a resistance.

4. The method as recited in claim 1, wherein the electric machine is switched from the disconnect mode to the short-circuit mode when a predefined time threshold is exceeded and a battery current exceeds a predefined threshold value.

5. The method as recited in claim 1, wherein the electric machine is switched from the disconnect mode to the short-circuit mode when a predefined time threshold is exceeded and a d.c. link voltage exceeds a predefined threshold value.

6. The method as recited in claim 1, wherein the electric machine is switched from the disconnect mode to the short-circuit mode when a predefined time threshold is exceeded, and a rotational speed exceeds a predefined threshold value.

7. The method as recited in claim 6, wherein the threshold value is approximately 50% of a maximum rotational speed.

8. A device for operating an electric machine having a pulse-controlled inverter in the event of a malfunction, the device comprising:
  a control unit adapted to trigger the pulse-controlled inverter in the event of a malfunction so that the electric machine initially is switched to a disconnect mode in which all switches of the pulse-controlled inverter are open and subsequently is switched to a short-circuit mode in which switches connected to a high potential are open and switches connected to a low potential are closed.

* * * * *

UNITED STATES PATENT AND TRADEMARK OFFICE
CERTIFICATE OF CORRECTION

PATENT NO. : 8,369,049 B2  
APPLICATION NO. : 12/160523  
DATED : February 5, 2013  
INVENTOR(S) : Kuehner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this
First Day of September, 2015

Michelle K. Lee
*Director of the United States Patent and Trademark Office*